Patented Jan. 16, 1934

1,944,109

UNITED STATES PATENT OFFICE 1,944,109

PROCESS FOR THE PRODUCTION OF ACETONE

Koloman Róka, Constance, Germany, assignor to Deutsche Gold- und Silber-Scheideanstalt Vormals Roessler, Frankfort - on - the - Main, Germany, a corporation of Germany No Drawing. Application July 23, 1931, Serial No. 552,791, and in Germany July 21, 1924

9 Claims. (Cl. 260—134)

In my co-pending application Serial No. 44,367, filed 17th July 1925 and matured into Patent No. 1,821,324, January 28, 1931 there is described a process for the production of acetone consisting in causing acetaldehyde and water vapor to react at temperatures between 250° and 660° C. in the presence of a catalyst, comprising an inorganic, oxygen-containing compound of a heavy metal.

It has been found that the reaction can be carried out with particular advantage if the catalyst consists of a mixture of basic oxygen compounds of metals, when at least one of the metals is a heavy metal. There may be used, for example, oxygen compounds of iron, manganese, copper, zinc and so forth, either together or with oxygen compounds of light metals, as for example calcium, magnesium, barium, beryllium and others of the second group of the periodic system. Particularly advantageous are mixtures of oxygen compounds of such metals which can replace one another isomorphously in carbonates. Also naturally occurring ores, such as breunerite (Mg—Fe) $CO_3$, zinc iron spar (ZnFe)$CO_3$, manganosiderite (FeMn)$CO_3$, manganese containing siderite form good catalysts.

In the chemical production of mixed catalysts it has been found of advantage to bring the separate constituents into as close contact with one another as possible, for example to place together the separate grains of the charge of the two constituents or to use one as a carrier for the other.

The mixed catalysts may consist of a catalytically acting basic oxygen compound of a heavy metal, for example iron oxide or manganese oxide and a metal, as for example iron. In this case the metal may be used as the carrier.

For example iron shavings or iron sponge may be provided with a superficial oxide layer or superficially oxidized iron may have applied thereto a further metal-oxygen compound, as for example calcium carbonate, zinc carbonate and the like and such products may be used as mixed catalysts. For example such a catalyst may be obtained by placing superficially rusty iron shavings in a dilute calcium acetate solution, evaporating the solution whilst stirring and then annealing the shavings. Mixed catalysts which contain the catalytically acting metal-oxygen compounds in the state of fine division, for example in the form of a sponge having a particularly advantageous action.

Examples

1. An iron tube of 34 mm. internal diameter, charged with granulated breunerite was heated over a length of 620 mm. up to 500–550° C. After this temperature was reached, a mixture of 195 grms. acetaldehyde and 2000 grms. of water was passed 7 hours through the tube. The escaping vapors were condensed. The condensate contained 65 grms. acetone, besides unconsumed acetaldehyde and acetic acid. The yield (calculated with respect to the acetaldehyde used) this amounted to 50.6% of the theoretical yield.

2. A quartz tube of 30 mm. internal diameter was charged with rusty iron filings or the like impregnated with calcium carbonate (for instance by a dilute calcium acetate solution, into which the filings or the like had been laid, being concentrated by evaporation, while being agitated, whereupon the filings were annealed) and heated to a length of 600 mm. up to 470–475°. Within 8 hours 165 grms. of acetaldehyde and 1500 grms. of water vapor were passed through. The condensate obtained from the escaping vapors contained 99 grms. of acetone. The yield (calculated with respect to the acetaldehyde used) thus amounted to 91% of the theoretical yield.

3. Iron shavings are coated with iron oxide and manganese oxide and charged into a reaction tube. A mixture of acetaldehyde and excess water vapor is passed at 475° C. through the reaction tube. The vapors which pass off are condensed. Acetone is obtained in a yield of more than 80% of the theoretical amount.

4. 1000 parts of iron sponge are added to a solution of 80 parts zinc acetate in water. The mass is evaporated to dryness and treated at 450° C. with air until practically no more oxygen is taken up. If at 450° C. there is conducted over this contact a mixture of acetaldehyde and water vapor a very good yield of acetone is obtained.

I claim:—

1. A process for the production of acetone consisting in causing acetaldehyde to react with water vapor at temperatures of 250 to 660° C. in the presence of a catalyst consisting of a mixture of oxygen compounds of metals which can replace one another isomorphously in carbonates.

2. A process for the production of acetone consisting in causing acetaldehyde to react with water vapor at temperatures of 250 to 660° C. in the presence of a catalyst consisting of an oxygen compound of iron and oxygen compounds of light metals.

3. A process for the production of acetone consisting in causing acetaldehyde to react with water vapor at temperatures of 250 to 660° C. in the presence of a catalyst consisting of an oxygen compound of iron and oxygen compounds of metals of the second group of the periodic system.

4. A process for the production of acetone consisting in causing acetaldehyde to react with water vapor at temperatures of 250 to 660 C. in the presence of a catalyst comprising essentially a mixture of basic-oxygen compounds of metals of which at least one must be a heavy metal.

5. A process for the production of acetone consisting in causing acetaldehyde to react with water vapor at temperatures of 250 to 660° C. in the presence of a catalyst comprising essentially a mixture of basic oxygen compounds of metals of which at least one must be a heavy metal, and at least one a basic oxygen compound of a light metal.

6. A process for the production of acetone consisting in causing acetaldehyde to react with water vapor at temperatures of 250 to 660° C. in the presence of a catalyst comprising essentially a basic oxygen compound of a heavy metal on a metal carrier.

7. A process for the production of acetone consisting in causing acetaldehyde to react with water vapor at temperatures of 250 to 660° C. in the presence of a catalyst comprising essentially a mixture of basic-oxygen compounds of metals of which at least one must be a heavy metal on a metal carrier.

8. A process for the production of acetone consisting in causing acetaldehyde to react with water vapor at temperatures of 250 to 660° C. in the presence of a catalyst comprising essentially iron oxide on carriers consisting of metallic iron.

9. A process for the production of acetone consisting in causing acetaldehyde to react with water vapor at temperatures of 250 to 660° C. in the presence of a catalyst comprising essentially basic oxygen compounds of metals, of which one must be an iron oxide on carriers of metallic iron.

KOLOMAN RÓKA.